G. F. WOOLSTON.
INDEXING ATTACHMENT FOR LATHE ATTACHMENTS.
APPLICATION FILED NOV. 16, 1917.
1,294,215.
Patented Feb. 11, 1919.
2 SHEETS—SHEET 1.
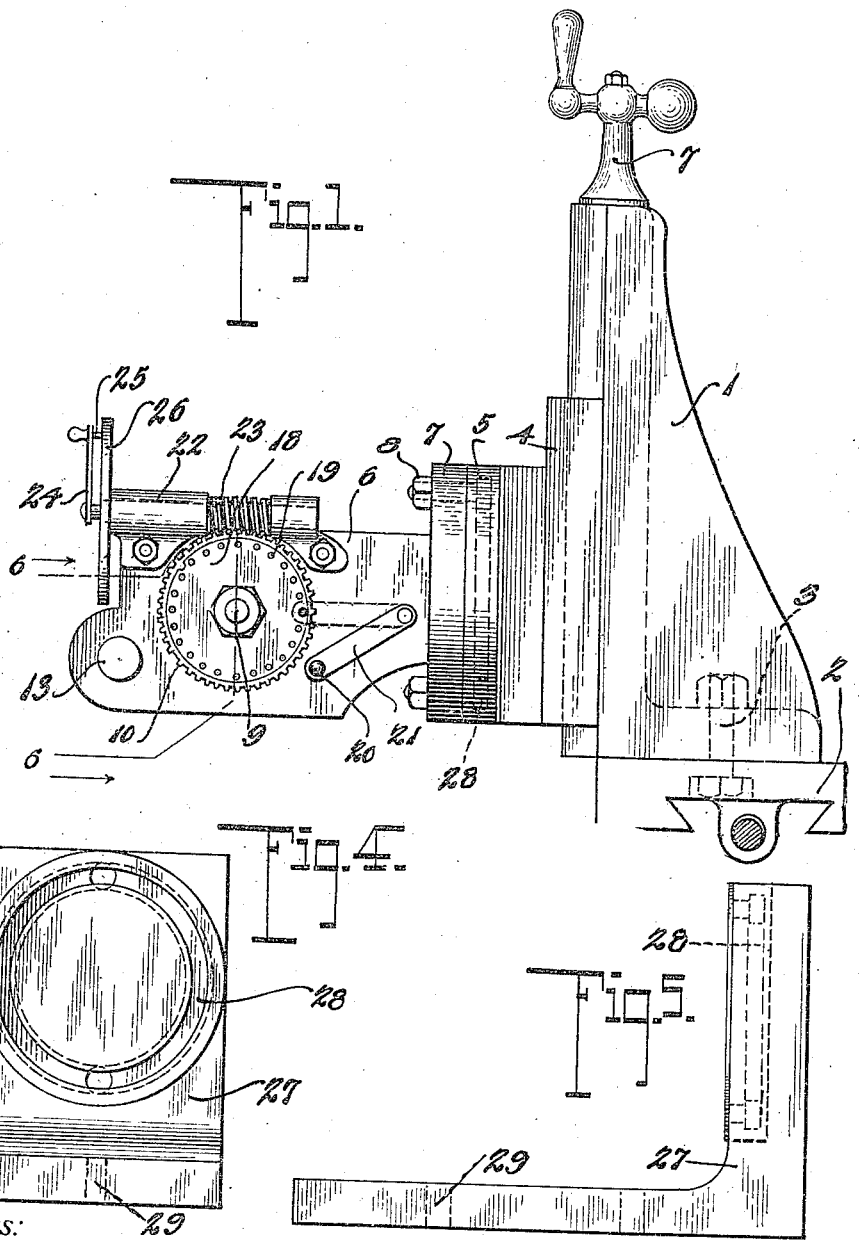
WITNESS:
E. H. Wagner.
INVENTOR.
George F. Woolston
BY Robb & Robb
ATTORNEYS

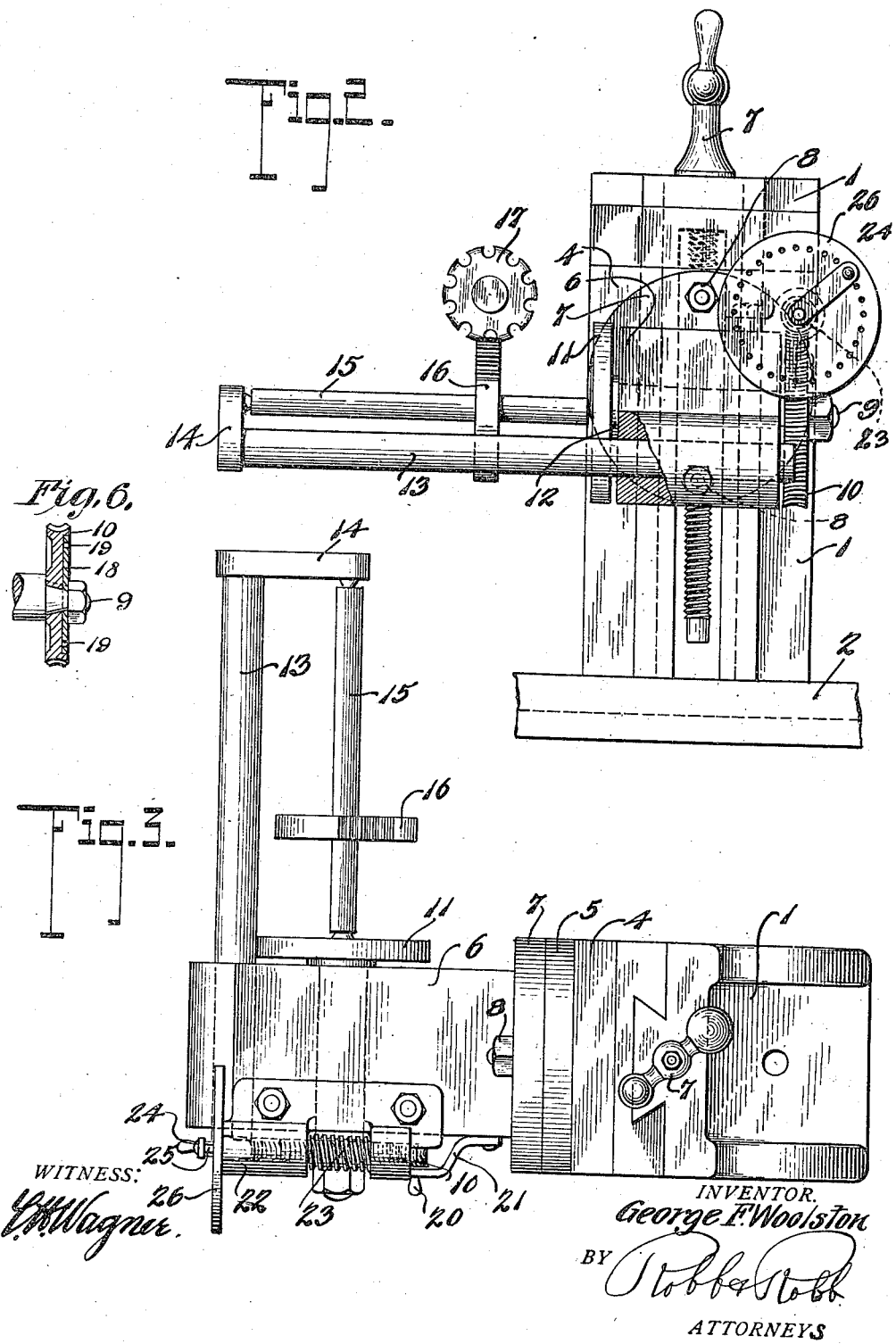

UNITED STATES PATENT OFFICE.

GEORGE F. WOOLSTON, OF NEW YORK, N. Y.

INDEXING ATTACHMENT FOR LATHE ATTACHMENTS.

1,294,215. Specification of Letters Patent. Patented Feb. 11, 1919.

Application filed November 16, 1917. Serial No. 202,309.

*To all whom it may concern:*

Be it known that I, GEORGE F. WOOLSTON, a citizen of the United States, residing at New York, in the county of New York and State of New York, have invented certain new and useful Improvements in Indexing Attachments for Lathe Attachments, of which the following is a specification.

The present invention has to do with improvements in milling attachments for metal working machines of the type disclosed by my co-pending application executed and filed of even date herewith, but more particularly appertaining to an indexing device forming a part of such attachment. The device is characterized by its simplicity of construction, range of adjustability, and its arrangement by which direct or indirect indexing may be accomplished.

In the accompanying drawings:

Figure 1 is a side elevation showing the application of the indexing device to a lathe attachment;

Fig. 2 is an end elevation thereof;

Fig. 3 is a top plan view; and

Figs. 4 and 5 are front and side elevations of a support adapted to be used when the device is applied to a milling machine table.

Fig. 6 is a sectional view taken about on the plane indicated by the lines 6—6 of Fig. 1, showing more clearly the detachability of the index plate.

Referring to the drawing, 1 indicates the standard of the lathe attachment which has swivel connection with the cross slide 2 of a lathe through the bolt member 3, said standard carrying the vertically adjustable slide 4 flanged at one side as indicated at 5 for providing a swivel connection for the interchangeable devices applicable to the lathe attachment. One of such devices forms the subject matter of the present invention and consists of the indexing device 6 formed at one side with a flange 7 complemental to the flange 5, connecting bolts 8 being utilized to provide for the swivel connection hereinbefore referred to.

The device 6 is centrally bored to receive the index spindle 9 threaded at one end to receive the worm gear 10 for operating the spindle and also threaded at its opposite end to receive a face plate chuck or fixture carrying center 11. The spindle is furthermore provided with an annular flange 12 against which the chuck referred to is disposed. Adjacent to the outer end of the device 6 a second bore is provided to receive the extension bar 13 having the outboard center 14 between which and the part 11 the work supporting bar 15, for example, is disposed, said bar having mounted thereupon in the illustration a gear blank 16 which is operated upon by the lathe cutter 17.

In order to secure direct indexing or in performing indexing work where accuracy is not an essential element, an indexing plate 18 is attached to the end of the index spindle 9, said plate being suitably provided with apertures 19 in which the stop pin 20 of the handle 21 engages.

Where, however, indirect indexing is required for operating upon work involving accuracy, a detachable bearing bracket 22 is connected to the indexing device above the worm gear 10, said bracket having mounted therein the worm screw 23 which is operable by the handle 24 provided with a stop pin 25 which is engageable with the stationary face plate 26 fixed to said bracket. It will be apparent from the foregoing description that a very simple apparatus is provided for forming an interchangeable indexing attachment for lathe attachments, said indexing device being capable of adjustment in different angles of the vertical plane by reason of its swivel connection and also adjustable in a horizontal plane by virtue of the swivel connection of the standard 1 with the lathe.

This device is also of such a construction that it may be readily applied to a milling machine table, in which case the angle support 27 shown in Figs. 4 and 5 is used, said support being provided with the annular groove 28 to receive the T-headed bolts 8, and the base of the support being suitably bored as at 29 for attachment to the milling machine table.

With the adjustments made possible by the particular arrangement disclosed in combination with the vertical adjustment of the lathe attachment and the longitudinal and transverse adjustments produced by the lathe to which it may be connected, the adjustment of the index in this apparatus is universal to all practical purposes.

Having thus described my invention, what I claim as new is:

1. The combination, with a support having means for producing vertical adjustment, of an indexing attachment to which such adjustment is imparted having swiveled connection therewith for angular adjustment in a vertical plane, whereby to dispose the article to be worked upon in position for bevel cutting, said attachment comprising an index spindle, an operating gear secured to one end thereof for rotating the spindle, an index plate detachably mounted on the spindle against the operating gear, and stop means engageable with the plate whereby direct indexing may be produced.

2. The combination, with a lathe attachment having means for producing vertical adjustment, of an indexing attachment having swiveled connection therewith for angular adjustment in a vertical plane, whereby to dispose the article to be worked upon in position for bevel cutting, said attachment comprising an index spindle, an operating member secured to one end thereof for rotating the spindle, and indexing means operatively and removably mounted contiguous to the operating member, said means being removable for direct indexing and attachable for indirect indexing.

3. An indexing device for lathe attachments comprising an index spindle, a worm gear secured to one end thereof, a fixture attached to the opposite end of said spindle, a work holding support carried by the said device intermediate which and the fixture the part to be operated upon is supported, and indexing means therefor consisting of a bracket, a worm shaft mounted therein, manipulating handle for said shaft, and a relatively stationary indexing plate with which said handle is coöperative.

4. An indexing device for lathe attachments comprising an index spindle, a worm gear secured to one end thereof, a fixture attached to the opposite end of said spindle, a work holding support carried by the said device intermediate which and the fixture the part to be operated upon is supported, indexing means comprising a bearing bracket removably attached to the attachment above the worm gear, a worm shaft carried by said bracket, an indexing plate fixed to the bracket at one end, and a manipulative handle secured to the worm shaft and having stop means coöperative with the stationary plate.

5. An indexing device for lathe attachments comprising an index spindle, a worm gear secured to one end thereof, a fixture attached to the opposite end of said spindle, a work holding support carried by the said device intermediate which and the fixture the part to be operated upon is supported, indexing means comprising a bearing bracket removably attached to the attachment above the worm gear, a worm shaft carried by said bracket, an indexing plate fixed to the bracket at one end, a manipulative handle secured to the worm shaft and having stop means coöperative with the stationary plate, said indexing means being detachable for direct indexing, and direct indexing means associated with the spindle for use when said first mentioned indexing means is detached.

In testimony whereof I affix my signature.

GEORGE F. WOOLSTON.

Copies of this patent may be obtained for five cents each, by addressing the "Commissioner of Patents, Washington, D. C."